United States Patent [19]

Halder et al.

[11] 3,911,019
[45] Oct. 7, 1975

[54] PREPARATION OF METHYLHEPTENONE
[75] Inventors: Niklaus Halder, Fullinsdorf;
 Heinrich Frick, Riehen, both of Switzerland
[73] Assignee: Hoffmann-La Roche Inc., Nutley, N.J.
[22] Filed: Aug. 10, 1973
[21] Appl. No.: 387,404

[30] Foreign Application Priority Data
 Aug. 14, 1972  Switzerland.................. 12007/72

[52] U.S. Cl............................................. 260/597 R
[51] Int. Cl.².................................... C07C 45/02
[58] Field of Search......... 260/597 R, 593 R, 597 T

[56] References Cited
UNITED STATES PATENTS
2,297,039  9/1949  Melson........................ 260/486 R
2,628,252  2/1953  Albisetti........................... 260/486

OTHER PUBLICATIONS
Pommer et al., C.A., 87041f.

Primary Examiner—James O. Thomas, Jr.
Assistant Examiner—James H. Reamer
Attorney, Agent, or Firm—Samuel L. Welt; Jon S. Saxe; Richard A. Gaither

[57] ABSTRACT

Methylheptenone is obtained by heating a reaction mixture, which contains 1 part methyl vinyl ketone and 4 to 40 parts isobutylene, in the presence of a strong acid, to a temperature of 260°C. to 290°C. at a pressure at or above the vapor pressure of the reaction mixture.

7 Claims, No Drawings

PREPARATION OF METHYLHEPTENONE

BACKGROUND OF THE INVENTION

This application relates to the production of methylheptenone from the reaction of methyl vinyl ketone and isobutylene.

Methylheptenone is a valuable intermediate in the production of useful odorants and carotenoid compounds. α-Methylheptenone has heretofore been prepared directly from methyl vinyl ketone and isobutylene by heating the reactants at high temperature in the presence of water (U.S. Pat. No. 2,628,252) or in the presence of water and a polymerization inhibitor (German Pat. No. 973,089). However, the yields of methylheptenone from such processes have been relatively low.

There has been a need therefore for an improved process for preparing methylheptenone directly from methyl vinyl ketone and isobutylene.

SUMMARY OF THE INVENTION

In accordance with the process of this invention, methylheptenone is obtained by heating a reaction mixture, comprising 1 part by weight methyl vinyl ketone and about 4 to 40 parts by weight isobutylene, in the presence of a strong acid, to a temperature of about 260°C. to 290°C. at a pressure at or above the vapor pressure of the reaction mixture. By this process, yields of about 75% are obtained with virtually complete consumption of the methyl vinyl ketone utilized.

DETAILED DESCRIPTION OF THE INVENTION

As used throughout this application, the term "methylheptenone" comprehends 6-methyl-5-hepten-2-one, 6-methyl-6-hepten-2-one and mixtures of these isomers. Also in this application, the term "part" or "parts" as applied to the ratio of methyl vinyl ketone and isobutylene utilized, is parts by weight. Further in this application, the term "mol percent", as applied to the amount of strong acid utilized, is based on the amount of methyl vinyl ketone utilized.

By the process of this application, methylheptenone can be obtained by heating a reaction mixture, which comprises 1 part methyl vinyl ketone and 4 to 40 parts isobutylene, in the presence of at least one strong acid, to a temperature of 260°C. to 290°C. at a pressure at or above the vapor pressure of the reaction mixture. In this process, it is preferred that 16 to 28 parts of isobutylene be utilized, especially about 24 parts of isobutylene, per part of methyl vinyl ketone in the reaction mixture.

In carrying out the process of this invention, any conventional strong acid having a dissociation constant (in water at 25°C.) of greater than about $10^{-4}$ can be utilized. Among the strong acids which can be utilized, either individually or in combination, are the mineral acids, such as sulfuric acid, sulfurous acid, hydrochloric acid, perchloric acid, hydrobromic acid, hydroiodic acid and phosphoric acid, and the strong organic acids, such as formic acid, oxalic acid, trichloroacetic acid and the sulfonic acids. Among the foregoing strong acids, preferred for use in the process of this invention are the sulfonic acids. The preferred sulfonic acids include the aliphatic sulfonic acids, such as methanesulfonic acid, ethanesulfonic acid, 1-propanesulfonic acid, 2-propanesulfonic acid, and trifluoromethanesulfonic acid; the alicyclic sulfonic acids, such as camphorsulfonic acid; the aromatic sulfonic acids, such as p-toluenesulfonic acid, naphthalene-1-sulfonic acid naphthalene-2-sulfonic acid, benzenesulfonic acid, p-nitrophenylsulfonic acid and 4-chlorobenzenesulfonic acid; and the heterocyclic sulfonic acids such as pyridinesulfonic acid. Especially preferred are the aliphatic, alicyclic and aromaticsulfonic acids, particularly methanesulfonic acid, p-toluenesulfonic acid and camphorsulfonic acid.

In this process, the amount of the strong acid utilized is somewhat dependent on the actual strong acid used and from about 0.01 to 5 mol percent can be suitably utilized in the reaction mixture. Preferably, 0.1 to 0.2 mol percent of the strong acid is utilized, especially where the strong acid is a sulfonic acid. The particularly preferred amount of acid utilized in this process is about 0.13 mol percent, quite particularly where the strong acid is a sulfonic acid.

In carrying out the process of this invention, temperatures of about 260°C. to 290°C. are utilized, with temperatures of about 260°C. to 280°C. being preferred. Also in this process, pressures at or above the vapor pressure of the reaction mixture at the temperature of the reaction mixture are utilized. Of course, in this process, the exact pressure utilized will depend upon the total vapor pressure of the reactants utilized as well as of any inert materials, such as diluents and entrained air, which may also be present in the reaction mixture. Generally, it can be stated, however, that in carrying out this process at the preferred temperatures, pressures of about 300 atmospheres to about 360 atmospheres are utilized. However, in this process, greater pressures can also be suitably utilized, such as a pressure of up to approximately 500 atmospheres, as well as lower pressures of down to approximately 250 atmospheres, depending upon the components in the reaction mixture and the temperature to which the reaction mixture is heated in accordance with this invention.

In carrying out this process, the reaction mixture containing the methyl vinyl ketone, isobutylene and strong acid, can also contain one or more inert solvents. In this process, any conventional inert organic solvent can be utilized. Among the inert solvents which can be utilized, either individually or in a mixture of solvents, are the aliphatic and aromatic hydrocarbons, such as hexane, octane, benzene and toluene. The inert solvents can be individually present in trace or larger amounts. Also in this process, the reaction mixture can contain trace or larger amounts of materials, such as diacetone alcohol and mesityl oxide, and trace amounts of materials such as formaldehyde, which dilute somewhat the reaction mixture but do not significantly affect the formation of the methylheptenone. Preferably, this process is carried out without using any inert solvent or diluent material, and it is particularly preferred in this process to utilize conditions which are as anhydrous as possible.

The process of this application can be suitably carried out in a continuous or in a batchwise manner. When carried out batchwise, the process can be suitably completed in about 1 to 1½ hours.

In carrying out this process, the addition of small amounts of a polymerization inhibitor to the reaction mixture has been found to be useful in assuring that good yields of methylheptenone are obtained. In this process, any conventional polymerization inhibitor can be utilized, with hydroquinone, phenothiazine and thionine being preferred polymerization inhibitors.

In accordance with this application, methylheptenone is preferably obtained by the following procedure. A rotary autoclave is first charged with methyl vinyl ketone, which contains the acid in dissolved form, and a polymerization inhibitor. Precondensed isobutylene is then added, and the reaction is commenced. After the termination of the reaction, excess isobutylene is first distilled off from the reaction mixture. This excess isobutylene can, if desired, be recycled to subsequent batches.

The crude methylheptenone obtained by the process of this application can be purified in a conventional manner, as by fractional distillation of the reaction mixture. The purified methylheptenone obtained is a mixture of isomers, i.e., 6-methyl-6-hepten-2-one and 6-methyl-5-hepten-2-one. A separation of the two isomers is not necessary when the methylheptenone is to be used for the manufacture of ionone, which represents the main use of methylheptenone. However, if desired, the two isomers can be separated in a conventional manner.

By the process of this application, methylheptenone is obtained as a mixture of isomers in yields of about 75%, with virtually complete consumption of the methyl vinyl ketone utilized.

The following example illustrates this invention.

A gas-heated rotary autoclave (Cr-Ni-Mo-Steel), which is provided with a valve, thermometer branch, manometer and safety valve (525 atmospheres), is charged with 7.6 g (0.108 mol) of methyl vinyl ketone (purity*98%), stabilized with 130 mg of hydroquinone, and 34.5 mg of racemic camphor-10-sulfonic acid mono-hydrate. 147.5 g (2.63 mol) of isobutylene, condensed by means of dry ice is added, and the autoclave is immediately closed. The autoclave is then fixed on a rotation stand, heated slowly until an internal temperature of 70°C. is achieved, then heated quickly to 280°C., and then kept for 70 minutes at an internal temperature of 280°C. (The measured pressure fluctuates at the same time in a range of between 345 and 330 atmospheres). Then, the valve outlet of the autoclave is connected with a 1 liter flask, which is connected via a side-arm with a cooling trap (dry ice/acetone). By opening the valve, the reaction mixture is slowly distilled off. The reaction mixture is warmed to 20°C–25°C. (water bath), and the escaping, unreacted isobutylene is condensed in a 250 ml cooling trap. There is thus recovered 136 g (96.2%) of excess isobutylene. The crude methylheptenone yield, amounting to 17.5 g., is added to a 100 ml round-bottomed flask, and residual isobutylene is distilled off at 11 mmHg into a cooling trap. Then, the methylheptenone is from the almost horizontally positioned flask at 120°C.–130°C. air bath temperature (sublimation oven) and 11 mmHg into a cooling trap (−50°C.) The weight of the distillate is 13.5 g and contains 75.6 weight percent methylheptenone. Yield is 10.2 g of methylheptenone (74.6% based on methyl vinyl ketone). The distillate is then fractionated by means of a spinning-band column (pressure: 35 mmHg, flask temperature 88°C., jacket temperature 80°C. head temperature 85°C., reflux ratio: out put 1″, reflux 5″). There is obtained a product which is a Ca. 97 percent by weight mixture of the isomers 6-methyl-6-hepten-2-one and 6-methyl-5-hepten-2-one.

*major impurities are acetone, diacetone alcohol, mesityl oxide.

We claim:

1. A process for obtaining methylheptenone, comprising heating a reaction mixture, which comprises 1 part by weight methyl vinyl ketone, about 4 to 40 parts by weight isobutylene, and from 0.1 to about 0.2 mole percent, based on methyl vinyl ketone, of a strong acid, having a dissociation constant of greater than $10^{-4}$ selected from the group consisting of sulfuric acid and a sulfonic acid, to a temperature of about 260°C. to 290°C. at a pressure at or above the vapor pressure of the reaction mixture.

2. The process of claim 1 wherein said reaction mixture is heated to a temperature of 260° to 280°C.

3. The process of claim 1 wherein said reaction mixture contains about 16 to 28 parts by weight of isobutylene per part by weight of methyl vinyl ketone.

4. The process of claim 3 wherein said reaction mixture contains about 24 parts by weight of isobutylene per part by weight of methyl vinyl ketone.

5. The process of claim 1 wherein said reaction mixture contains about 0.13 mol percent of said strong acid, based on methyl vinyl ketone.

6. The process of claim 1 wherein said sulfonic acid is an aliphatic, alicyclic or aromatic sulfonic acid.

7. The process of claim 6 wherein said sulfonic acid is methanesulfonic acid, p-toluenesulfonic acid or camphorsulfonic acid.

\* \* \* \* \*